United States Patent [19]

Henke

[11] E Re. 30,200

[45] Reissued Feb. 5, 1980

[54] HAY STACKING MACHINE

[75] Inventor: Donald L. Henke, Creston, Nebr.

[73] Assignee: Veda, Inc., Long Lake, Minn.

[21] Appl. No.: 795,666

[22] Filed: May 10, 1977

Related U.S. Patent Documents

Reissue of:

[64] Patent No.: 4,022,004
Issued: May 10, 1977
Appl. No.: 546,385
Filed: Feb. 3, 1975

[51] Int. Cl.[2] ..... A01D 87/12

[52] U.S. Cl. ..... 56/346; 100/35; 414/132

[58] Field of Search ..... 56/344–348, 56/350, 364, 1; 130/20; 100/35, 65–69, 50; 214/9, 17 C; 198/508

[56] References Cited

U.S. PATENT DOCUMENTS

| | | | |
|---|---|---|---|
| Re. 27,706 | 7/1973 | Carson | 56/350 |
| 564 | 2/1861 | Stone | 56/346 |
| 253,940 | 2/1882 | Newsom | 56/345 |
| 571,865 | 11/1896 | Spaulding | 56/345 |
| 1,002,438 | 9/1911 | Federsen | 56/345 |
| 1,086,005 | 2/1914 | Weigel | 56/344 |
| 1,302,030 | 4/1919 | Geho | 56/34 |
| 1,704,190 | 3/1929 | Hall | 56/346 |
| 1,919,896 | 7/1933 | MacGregor | 56/364 |
| 2,292,280 | 8/1942 | McGuire et al. | 56/345 |
| 2,328,790 | 9/1943 | Dorsey | 56/346 |
| 2,391,427 | 12/1945 | Kucera | 56/370 |
| 2,581,486 | 1/1952 | Jamieson | 56/346 |
| 2,648,945 | 8/1953 | Harrington | 56/346 |
| 2,748,965 | 6/1956 | Grey | 214/505 |
| 2,766,576 | 10/1956 | van der Lely | 56/345 |
| 3,110,148 | 11/1963 | Mader et al. | 56/347 |
| 3,331,199 | 7/1967 | Dechentreiter | 56/364 |
| 3,538,696 | 11/1970 | Carson | 56/350 |
| 3,552,109 | 1/1971 | Murray et al. | 56/343 |
| 3,691,741 | 9/1972 | White et al | 56/344 |
| 3,720,052 | 3/1973 | Anderson et al. | 56/346 |
| 3,925,974 | 12/1975 | Bartlett | 56/346 |

FOREIGN PATENT DOCUMENTS

| | | | |
|---|---|---|---|
| 892881 | 2/1972 | Canada | 56/364 |
| 1215994 | 5/1966 | Fed. Rep. of Germany | 56/344 |
| 1215996 | 5/1966 | Fed. Rep. of Germany | 56/344 |

*Primary Examiner*—Russell R. Kinsey
*Attorney, Agent, or Firm*—Burd, Braddock & Bartz

[57] ABSTRACT

A portable tiltable platform includes a trough extending to the peripheral edge for communication with hay being transported to it from a rake pickup which feeds it to an auger and in turn to a compressing roller and then into the inlet end of the trough at the peripheral edge of the platform when the platform is in the horizontal transport position. The trough includes a longitudinally extending side wall and a bottom wall which extends laterally to merge with the platform top surface. The bottom wall merges at its forward inner end with a portion extending upwardly to merge with the platform surface. A portion of the platform surface extends over the vertical wall of the trough and over reciprocating out of phase feed teeth in the bottom wall and vertical wall of the trough. An annular frame extends around the platform and rotates relative thereto. A plurality of posts are provided which have compression arms extending to the center of the platform which receives hay from the outlet end of the trough. The pressure arms moving arcuately engage the hay to sweep it along the platform top surface causing a stack to form from the bottom up. The compression arms decrease their pressure on the hay as the arms move upwardly while the total pressure remains substantially constant since the hay increases in weight as it increases in height. The unloading of the platform is accomplished by opening gate sections forming the cage around the stack and tipping the platform rearwardly and downwardly followed by operation of a push-off member which moves from the forward end to the rearward end of the platform.

55 Claims, 21 Drawing Figures

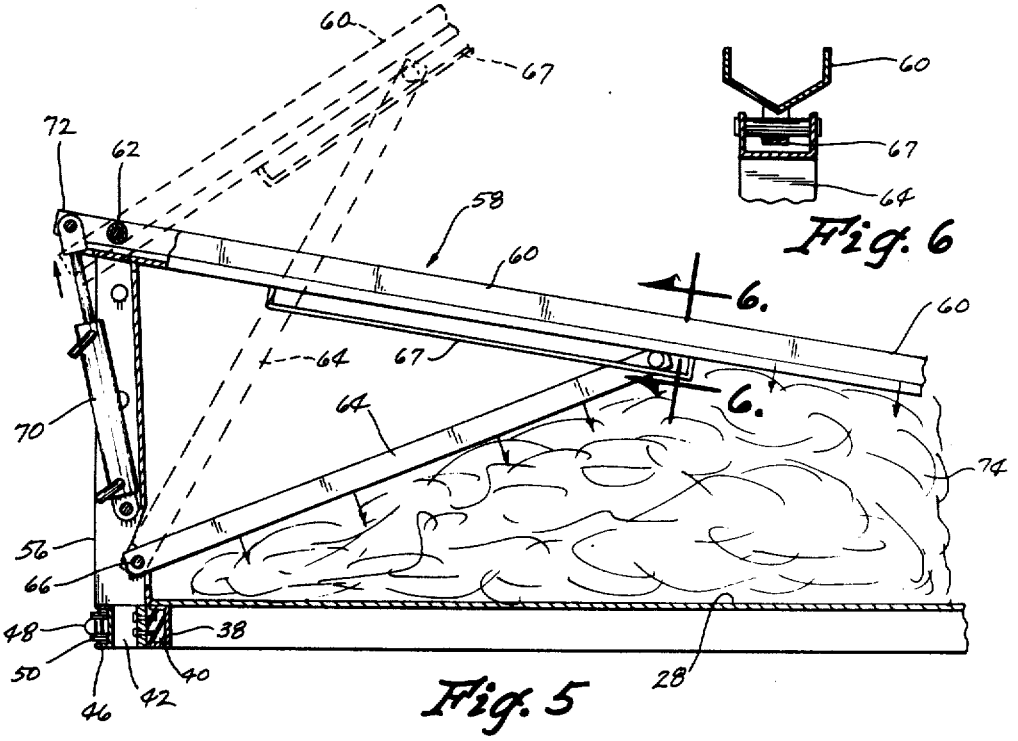
Fig. 5
Fig. 6
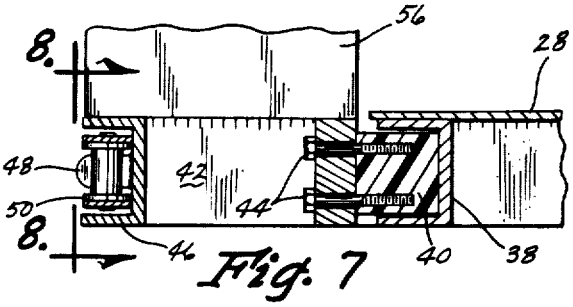
Fig. 7
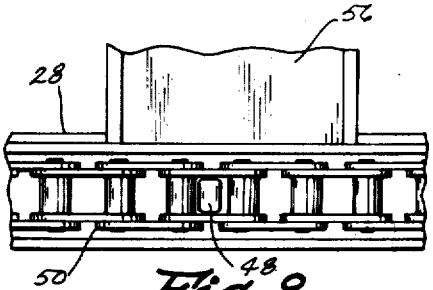
Fig. 8
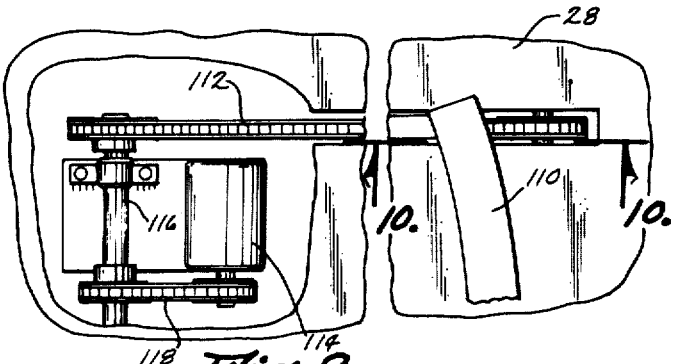
Fig. 9
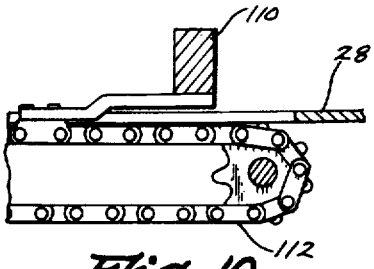
Fig. 10

HAY STACKING MACHINE

Matter enclosed in heavy brackets [ ] appears in the original patent but forms no part of this reissue specification; matter printed in italics indicates the additions made by reissue.

BACKGROUND OF THE INVENTION

This invention relates to a machine capable of making stacks of hay weighing on the order of six tons and measuring 13 feet in diameter and 13 feet high. In recent years the trend has been toward storing hay in larger units as compared with the smaller bales previously commonplace and capable of being carried by one person. The stack of this invention is intended to remain outside on the ground after being made on a portable platform.

SUMMARY OF THE INVENTION

In accordance with the present invention a hay stack making machine is provided which picks the hay up off of the ground and feeds it through a compactor to compress and flatten it whereupon it is fed into a trough in the platform where it is then carried by reciprocating vertical and horizontal teeth to the platform surface. A cage is formed around the platform and includes a plurality of inwardly and downwardly extending compression arms which engage the hay and cause the hay to turn with the cage and pick up additional hay moving to the platform from the trough and thus allowing the stack to be formed from the bottom up. As the compression arms move to an upwardly extending angular position their downward pressure is reduced however the weight of the stack is increasing thus maintaining the necessary weight on the incoming hay to cause it to continue the stacking operation as the cage is rotated. Upon the stack being completed on the platform the cage is rotated to a position with rearwardly opening gates being at the rear of the platform and a pusher mechanism is actuated which moves from the front edge of the platform to the rear pushing the stack off onto the ground. The platform has been tipped rearwardly and downwardly such that gravity assists in the removal of the stack from the platform. The platform is then returned to the horizontal position as the stacker is moved away from the stack and is now ready to form another stack of hay.

The trough through which the hay moves to reach the platform from the outer peripheral edge is formed by a vertical side wall on one side and a bottom wall which merges into the platform top surface on the other side and at the inner longitudinal end thereof such that the hay moves along a gentle incline plane to the top platform surface. A portion of the platform extends over the vertical wall and by so doing covers vertically and horizontally oriented reciprocating feeding teeth positioned in the trough bottom wall and vertical side wall. A transversely extending notch is provided in the platform wall portion at the longitudinal inner end to allow the hay in its flattened condition to move smoothly onto the platform. The bottom wall of the trough at the inner end includes a portion which extends upwardly to merge with the platform top surface.

The feeder teeth are operated off of a crank such that when the vertically oriented teeth in the trough bottom wall are moving longitudinally forwardly the feeder teeth in the vertical side wall are moving longitudinally rearwardly. The vertical teeth have gripping edges on the forward sides only and the back sides are smooth to allow them to move under the hay on their return stroke. The teeth in the vertical wall are arranged on a member connected to the crank which moves away from the vertical wall and trough on the return stroke or portion of the crank cycle and then moves the teeth into the trough on the feeding portion of the cycle.

A further tooth is provided for extending through the vertical side wall of the trough and this tooth is free to pivot forwardly only thus allowing it to move rearwardly and be folded forwardly by the hay in preparation for its feeding stroke as it moves forwardly.

DESCRIPTION OF THE DRAWINGS

In the drawings which illustrate an embodiment of the invention:

FIG. 5 is a cross sectional view taken along line 5—5 in FIG. 4 and illustrates the operation of the compression arms.

FIG. 6 is a cross sectional view taken along line 6—6 in FIG. 5.

FIG. 7 is an enlarged cross sectional view illustrating the rib and groove slidable connection between the cage and the platform.

FIG. 8 is a cross sectional view taken along line 8—8 in FIG. 7.

FIG. 9 is a fragmentary top plan view of the platform illustrating the push-off mechanism.

FIG. 10 is a cross sectional view taken along line 10—10 in FIG. 9.

DESCRIPTION OF THE PREFERRED EMBODIMENT

Figure 1:
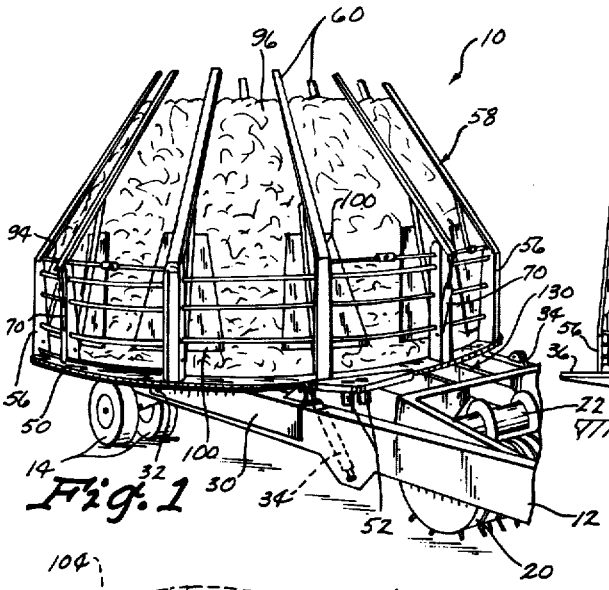
FIG. 1 is a fragmentary perspective view of the hay stacking machine of this invention.
Figure 2:
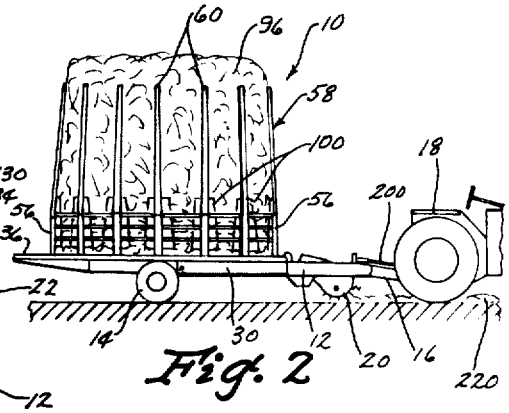
FIG. 2 is a side elevation view thereof.

The hay stacking machine of this invention is referred to generally in FIG. 1 by the reference numeral 10 and is provided with a frame 12 having wheels 14 and a tongue 16 for attachment to a tractor 18. The frame 12 at its forward end carries a pickup rake 20 which feeds hay to a screw conveyor 22 having oppositely disposed flights for moving hay to the center thereof to be fed through a roller compressor 24 just prior to being fed into the feeding trough 26, as seen in FIG. 16A in the platform 28.

Figure 17:
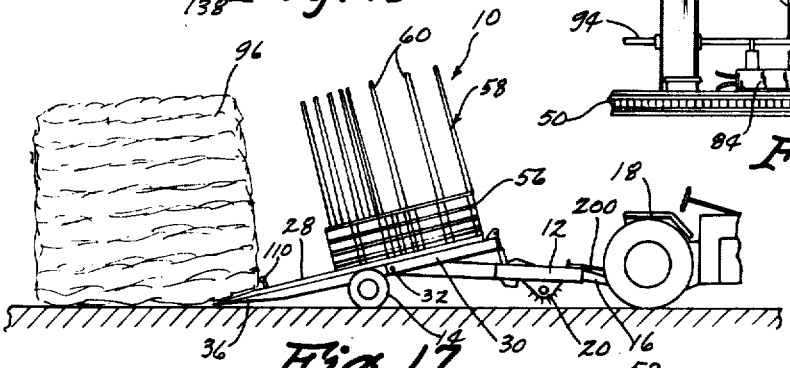
FIG. 17 is a reduced in scale side elevation view illustrating the unloading of the platform by tipping the platform downwardly and rearwardly.

The platform 28 is carried on the frame 12 by side frame members 30 being pivoted at 32 by power cylinders 34 in the frame members 12 such that the platform may be tilted between the loading and transport position of FIG. 1 to the unloading position of FIG. 17. It is seen that an unloading apron 36 is positioned rearwardly of the circular platform 28 on which the stack is formed.

Figure 3:
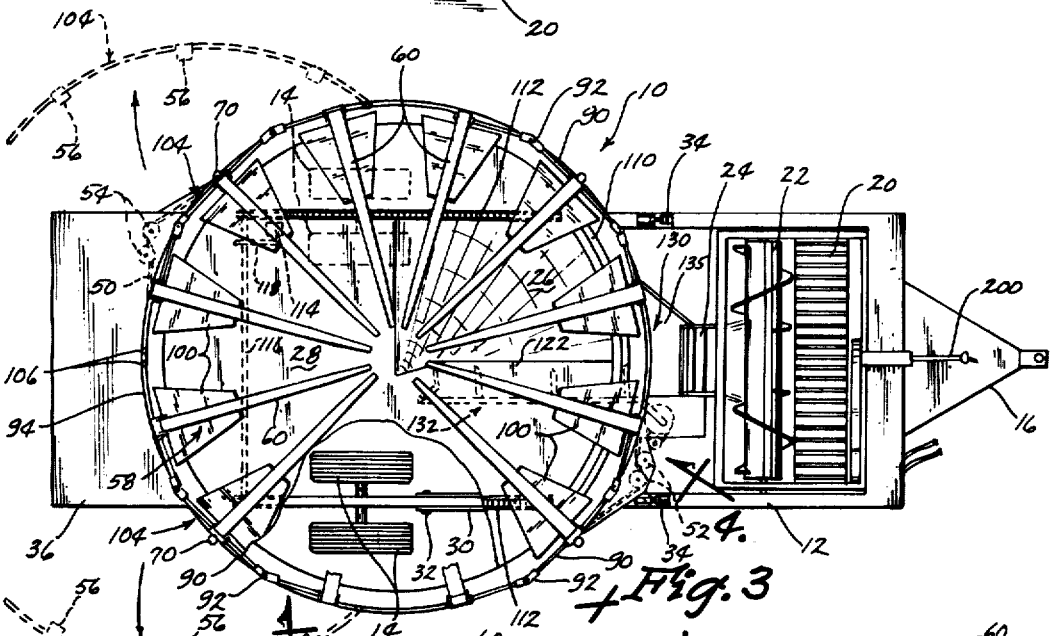
FIG. 3 is a top plan view thereof.
Figure 4:
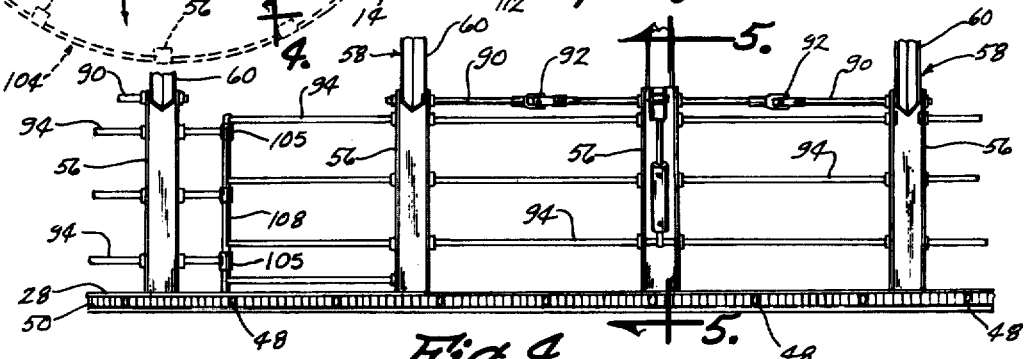
FIG. 4 is a cross sectional view taken along line 3—3 in FIG. 3.

The platform 28 in FIG. 7 is seen to have an annular channel 38 around its outer periphery which slidably and rotatably receives a slide block 40 of plastic material such as Ryerson 12, Ryerson & Sons, Chicago, Illinois. The slide block 40 is held to an annular cage frame 42 by bolts 44. An outwardly facing channel 46 is provided on the annular frame 42 and includes a plurality of spaced apart teeth 48 which engage a drive chain 50 powered by a pair of hydraulic motors 52 at the front end of the table, as seen in FIG. 3, and a pair of drive motors 54 at the rear end of the table to provide continuous rotation of the annular frame 42. The frame 42 is seen to carry a plurality of spaced apart posts 56 on which compression arms 58 are provided. The compression arms 58 include a top arm portion 60 pivotally connected at 62 to the top of the post 56 and a bottom arm portion 64 pivotally connected at 66 adjacent the platform 28. The outer end of the lower arm 64 is pivotally and slidably connected to the upper arm 60 and moves in a track 67 as the upper arm 60 is raised and lowered in response to operation of a hydraulic cylinder 70 extending between the post and the outer end portion 72 of the arm 60. The upper arm 60 is V-channel shaped in cross section as seen in FIG. 6 to provide maximum strength with minimum weight. It is seen in FIG. 5 that maximum downward pressure on the hay 74 on the platform 28 occurs when the compression arms 58 are extending generally laterally outwardly and minimum pressure is applied when the arms are extending substantially upwardly due to the lever arm portion 72 being shorter when the compression arms are extending upwardly.

Figure 18:
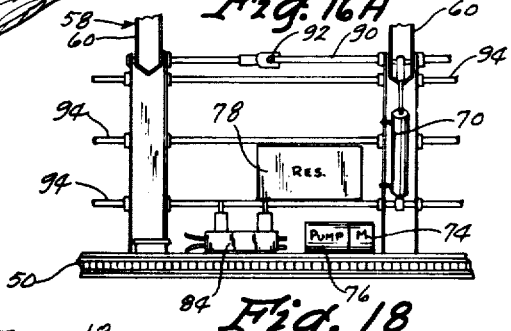
FIG. 18 is a fragmentary side elevation view illustrating the power system for the compression arms.
Figure 19:
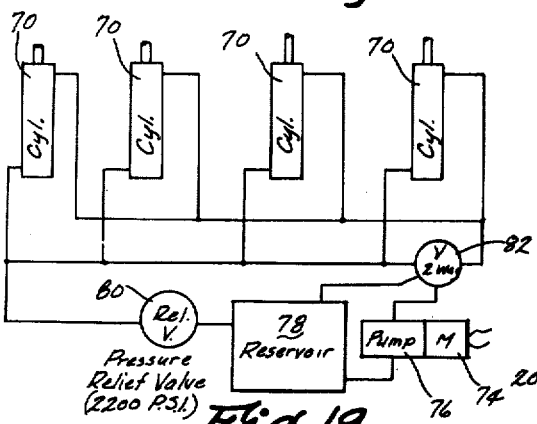
FIG. 19 is a schematic view of the power system for the compression arms.

The compression arms 58 are operated by the power cylinders 70, as seen in FIG. 19, which are in a separate system from the other operational systems of the hay stacking machine. An electric motor 74 powered from the tractor 18 drives a pump 76 in communication with a reservoir 78 connected to a relief valve 80 set at 2200 p.s.i. such that this pressure is maintained in each of the cylinders 70 at all times. Two-way operation of the cylinders is possible through the two-way control valve 82. Continuous operation of the motor 74 and pump 76 is avoided by temporary operation occurring at every revolution of the table 28 by operation of a switch actuator 84 as seen in FIG. 18. Thus, if the pressure has fallen below the 2200 p.s.i. level it will be automatically brought back up each revolution of the table.

Each power cylinder 70 operatively operates three compression arms 58 through a laterally extending drive shaft 90 having a universal joint 92. The posts 56 are further interconnected by fencing pipes 94 to form a cage for the stack of hay 96. The lower compression arms 64 are provided with enlarged trapezoidal pressure plates 100 to assist in shaping the stack 96 and applying uniform pressure to it as the stack is being formed. The pressure provided by the compression arms on the hay being fed to the platform is particularly important in the early forming stages when the hay weight is small in order to maintain the sweeping action of the hay on the platform 28, which picks up hay coming from the trough 26. As the stack 96 grows and its weight increases the problem is less and the pressure applied by the compression arms 60 and 64 becomes less due to the change in length of the lever arm 72.

The unloading of the platform 28 as seen in FIG. 3, involves the cage having two gate sections 104 wherein the rails 94 interconnect the posts 56 and allow the gate sections to swing outwardly to the dash-line position of FIG. 3 away from the supporting annular frame 42. The rails 94 are pivoted through sleeves [106] *105* slidably and rotatably embracing vertical tubular posts 108. A conventional latch 106 is employed for locking the free ends of the gates 104 together in their closed position.

The push-off arm for the hay stack 96 is best seen in FIGS. 3, 9 and 10 and includes an arcuate member 110 connected at its opposite ends to a pair of drive chains 112 recessed in the platform 28. The drive chains 112 are powered by a hydraulic motor 114 connected to the shaft 116 by the sprocket chain 118, as seen in FIG. 9. Thus it is seen that operation of the push-off 110 moves the member across the trough 26 to the rear end of the platform 28 whereupon it is then returned to the forward end adjacent the annular frame 42 ready for the next push-off operation.

Figure 11:
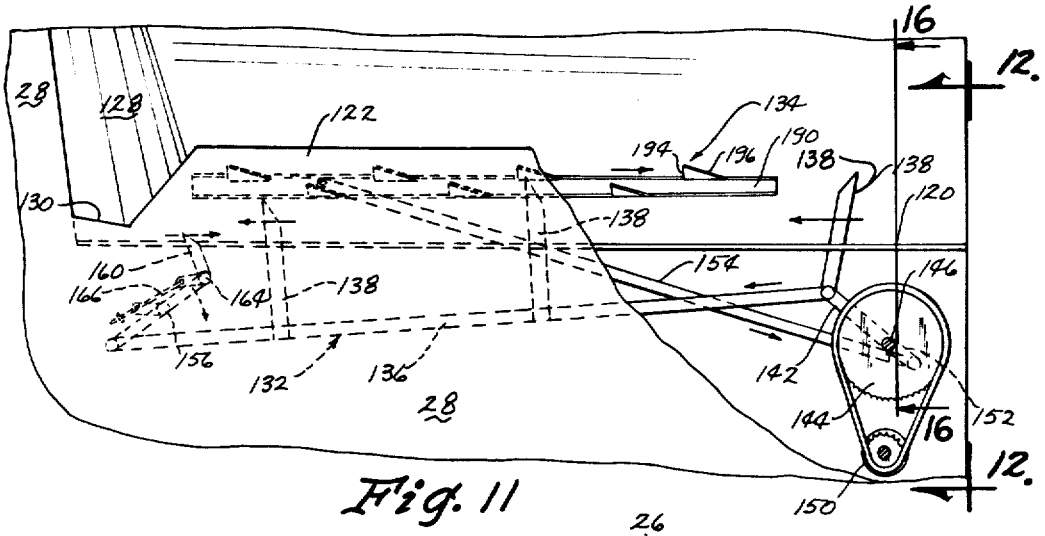
FIG. 11 is a fragmentary top plan view of the platform illustrating the reciprocating vertical and horizontal feed means.
Figure 12:
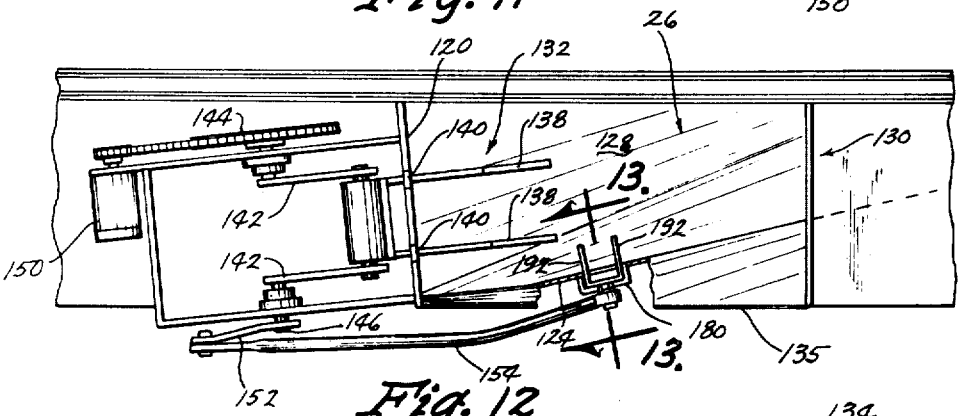
FIG. 12 is a cross sectional view taken along line 12—12 in FIG. 11.
Figure 13:
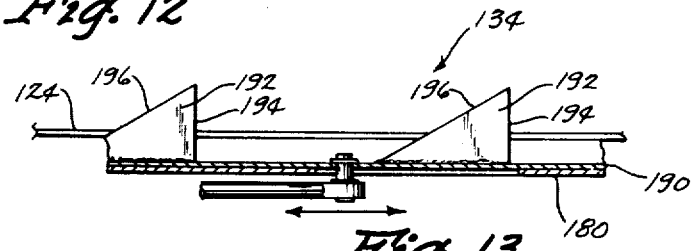
FIG. 13 is a cross sectional view taken along line 13—13 in FIG. 12.
Figure 16:
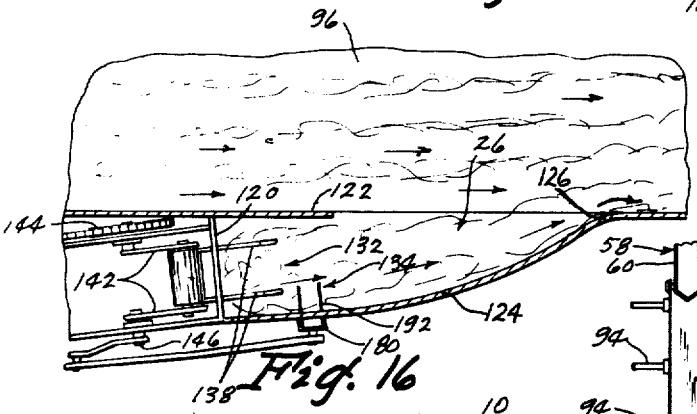
FIG. 16 is [a] *an enlarged* cross sectional view of the platform *taken along line 16—16 of FIG. 11* illustrating the feeding means in the trough leading to the platform.
Figure 16A:
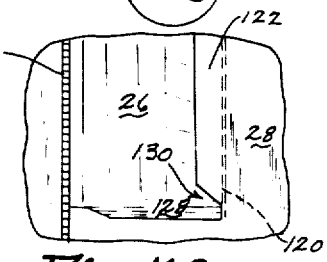
FIG. 16A is a fragmentary top plan view of the feed trough in the platform.

The trough 26 is best seen in FIGS. 3, 11, 12, 16 and 16A and includes a longitudinally extending vertical side wall 120 positioned under a platform wall portion 122. A bottom wall portion 124 extends from the lower edge of the vertical wall 120 laterally to merge at 126 with the top surface of the platform 28, as seen in FIG. 16. The foward end of the trough is defined by a forwardly and upwardly extending portion 128 which merges into the top surface of the platform 28. A laterally extending slot 130 is formed at the forward end of the platform portion 122 and extends to substantially the vertical wall 120, as seen in FIG. 11. The trough 26 is provided with an inlet mouth opening 130 at the outer peripheral edge of the platform 28 and this opening is adapted to communicate with a feeding apron 135 which receives a flattened layer of hay from the compressing roller 24, as seen in FIG. 3.

The hay, as seen in FIG. 16, is fed from the mouth opening 130 in the trough 26 to the platform 28 by reciprocal operation of staggered vertical and horizontally oriented feed means 132 and 134, respectively. The feed means 132 includes an elongated frame member 136 along which are spaced U-shaped teeth 138 adapted to extend through the vertical wall 120 utilizing the slots 140 formed in the wall. A pair of crank arms 142 carried on shafts 146 rotate in response to a drive sprocket 144 driven by a hydraulic motor 150. A further crank arm 152 is connected to the shaft 146 and extends in the opposite direction therefrom, as seen in FIG. 11. Crank arm 152 is then connected to an elongated link member 154 for reciprocally operating the feeding means 134 which is 180° out of phase with the feeding means 134.

Figure 14:
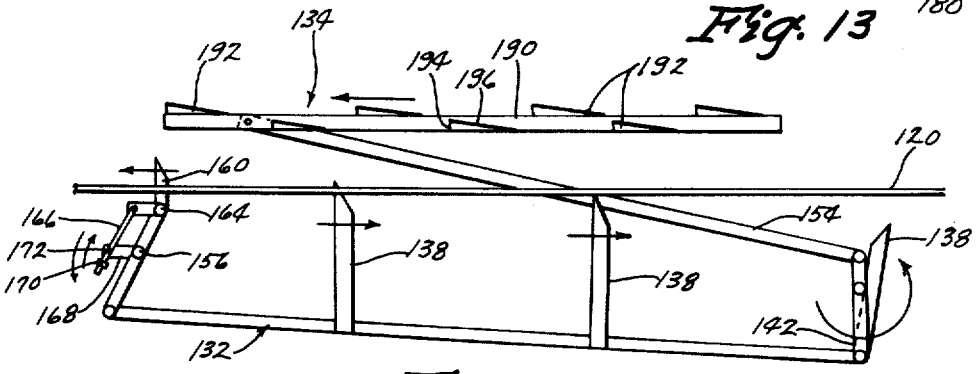
FIG. 14 is a view similar to FIG. 11 but illustrating the feeding means in different positions.
Figure 15:
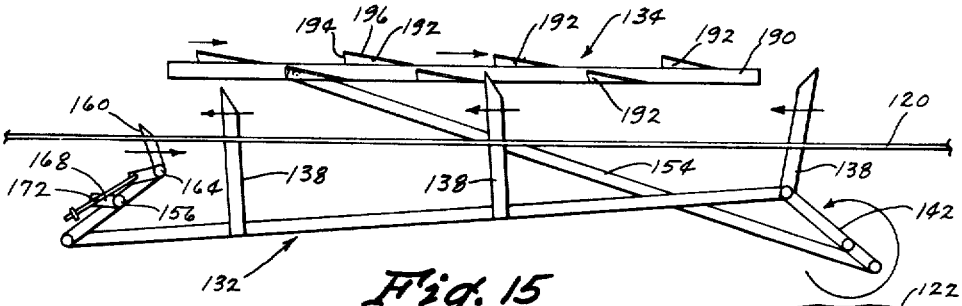
FIG. 15 is a view similar to FIGS. 11 and 14 showing the feeding means in still further positions.

The forward end of the feed means 132 is pivotal about an axis at 156 connected to a link 158 in turn having a tooth 160 with a perpendicularly extending arm 162 pivotally connected thereto at 164. An adjustable rod 166 connects the outer free end of the link 162 to a link 168 connected at the pivot shaft 156. The rod 166 includes an adjustable nut 170 and is adapted to slidably move through an ear 172 such that the tooth 160 is free to pivot forwardly when the feeding means 132 is on the out phase of each revolution of the crank arm 142 whereby the tooth 160 moves under the hay. On the other hand, when the feed means 132 is moving forwardly to the left, as seen in FIG. 14, the rod 166 limits clockwise pivotal movement of the tooth and thus the hay is moved to the left or forwardly onto the platform. The other teeth 138 reciprocate in and out of the wall 120, as seen in FIGS. 11, 14 and 15, and thus on the out phase of the crank 142 revolution the teeth are withdrawn from the trough and on the feeding phase of the revolution the teeth are in the trough as seen in FIGS. 11 and 15 pushing hay onto the platform from the trough, as seen in FIG. 16.

The vertically arranged feeding means 134, as previously indicated, is 180° out of phase and thus when it is on the outtake the feeding means 132 is on the intake moving hay forwardly. The feeding means 134 includes a guide channel 180 welded to the bottom wall 124 of the trough 26. An elongated plate member 190 is positioned below the bottom wall 124 in the channel 180 and carries a plurality of spaced apart teeth 192 having forward vertical edges 194 and rearwardly tapering smooth edges 196 such that when the teeth are moving forwardly in the trough towards the platform the forward edges 194 grip the hay and move it forwardly but when the feeding means 134 is moving to the right or outwardly the smooth edges 196 slide under the hay with no affect thereon.

Figure 20:
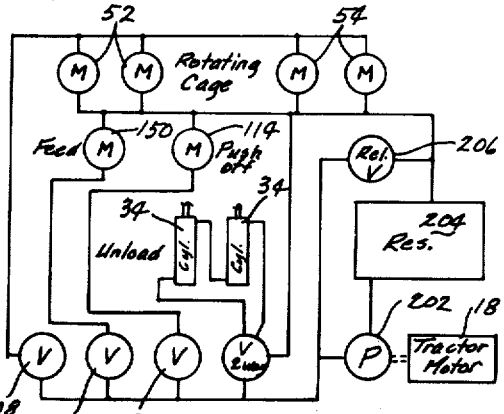
FIG. 20 is a schematic view for the hydraulic system operating the other mechanisms in the hay stacker.

The power for operating the rake 20, auger 22 and compressing roller 24, is supplied by the power takeoff drive shaft 200 driven by the tractor 18. The power takeoff also drives a pump 202, as seen in FIG. 20, which in turn is connected to a reservoir 204 and relief valve 206 for operation of the unloading power cylinder and rotating cage motors 52 and 54. The feed motor 150 for the feeding means 132 and 134 is also driven by the pump 202 as is the push-off motor 114. The rotating cage motors are operated by a control valve 208 while the valve 210 operates the feed motor and the push-off motors are operated by the valve 212.

Thus it is seen in operation that the tractor 18 pulls the hay stacking machine 10 along picking up hay 220 on the ground through the pickup rake 20 which feeds it to the auger 22 having inwardly directing flights in turn directing the hay then to the compressing roller 24 which feeds it onto the apron 135 adapted to register with the inlet trough opening 130 at the exterior peripheral edge of the table 28. It is seen that this communication is established only when the table 28 is in its loading or transport position of FIG. 1 and is broken when the table is tilted to the unloading position of FIG. 17. The hay continues its travel into the trough 26 where it is fed along the trough by the reciprocating out of phase feed means 132 and 134 in the vertical trough wall 120 and bottom wall 124. Each of these feed means are substantially covered by the platform wall portion 122 which allows the hay in the trough 26 to be fed onto the platform at the forward end of the trough by the hay moving upwardly along the forward trough wall 128, as seen in FIG. 11, and through the laterally extending notch 130 in the platform wall portion 122. This notch extends to substantially the vertical trough wall 120. The side of the trough opposite the wall 120 is formed by the merging of the bottom wall 124 with the top surface of the platform 28, as seen in FIG. 16. With the hay on the platform surface 28 the compression arms 58 having portions 60 and 64 extend downwardly onto the hay 74 to compress it against the platform 28 and cause it to sweep the hay coming out of the trough 26 up and onto the platform 28 thereby building the stack 96 from the bottom up as the frame 42 carrying the compression arms 58 rotates about the platform 28. The rotation of the frame 42 includes the cage structure of pipes 94. When the stack 96 is completed the cage, which has been continuously rotating, is stopped with the gates 104 facing the rear over the unloading platform 36 and then the unloading cylinders 34 operated to tip the table 28 downwardly at the rear end, as seen in FIG. 17 whereupon the push-off member 110 is operated and moves from the front of the platform to the rear taking with it the stack of hay 96. The push-off member 110 is then returned to the forward end of the platform ready for the next unloading operation. The platform is returned to its horizontal transport and loading position and the gates 104 are swung closed. The compression arms are again lowered ready to act upon the next hay fed from the trough 26 to the center of the platform. It is seen in FIG. 3 that the inner ends of the upper compression arms 60 all converge at the center of the platform which also is at the slot 130 such that the compression arms readily engage the hay and begin the revolution thereof over the platform surface 28 as the cage rotates in a counterclockwise fashion.

It is appreciated that positive control is maintained over the feeding of the hay onto the platform such that it can be proportioned under the stack and distributed evenly thus causing the stack to grow or rise on an even basis. The stack is formed independently of the operator of the pulling vehicle. The windrow of hay 220 may pass under any portion of the pickup rake 20 and in any event it will be funneled by the screw conveyor 22 through the restricted passageway through the roller compressor 24 onto the apron 135 and then into the trough 26 through the inlet mouth opening 130. Accordingly, the stack will grow uniformly avoiding tearing action that might otherwise occur and thus maintain its capability of staying intact when the stack is being unloaded.

I claim:

1. A hay stacking machine, comprising:

a platform having a top surface for the building of a hay stack thereon, said platform having a depression;

support means for supporting said platform above a supply of hay;

transport means for picking said hay up from said supply and moving said hay to said platform surface over said depression;

a frame positioned around the periphery of said platform, a plurality of radially extending compression arms vertically pivotally connected to said frame and adapted to move between downwardly and inwardly extending positions to upwardly and inwardly extending positions, and power means for yieldably maintaining pressure through said arms on hay on said platform and means for rotating said frame with said arms engaging said hay for moving hay into a layer and over said depression in said platform surface whereby said moving layer of hay sweeps up said hay moved to said platform surface and forms a stack from the bottom thereof with said compression arms pivoting upwardly as the stack increases in height.

2. The structure of claim 1 wherein the power means for yieldably maintaining pressure through said arms on said hay decreases said pressure while the pressure from said stack increases as the stack increases in weight and height thereby maintaining at all times a substantial amount of pressure on said hay moving to said platform surface.

3. The structure of claim 1 wherein said compression arms are mounted on upstanding posts positioned on said frame.

4. The structure of claim 3 wherein said compression arms include first and second arm portions pivotally connected in vertically spaced apart relationship to said posts and are movably connected to each other remotely of said posts to provide compression arms having a variable angular shape for shaping and compressing said stack along its sides and top.

5. The structure of claim 4 wherein the top arm portions of said pair of arms of said compression arms extend beyond the pivotal connection to said lower second arm portions.

6. The structure of claim 1 wherein said power means for said compression arms includes a hydraulic cylinder connected between said frame and one of said arms and laterally extending drive means are connected to adjacent arms for pivoting them between raised and lowered positions.

7. The structure of claim 1 wherein said frame includes a gate portion for allowing removal of said stack from said platform and said gate being movable between open and closed positions.

8. The structure of claim 7 wherein a push-off means is provided on said platform to move over said platform towards said open gate for removing said stack from said platform.

9. The structure of claim 8 wherein said platform is vertically pivotable between a horizontal transport position and a tipped unloading position with said gate being positioned on the lowermost side of said platform in said tipped position to allow removal of said stack.

10. The structure of claim 8 wherein said push-off means is further defined as including a pair of sprocket chains in said platform on opposite sides of said longitudinal center and a push-off member extends between said chains and is movable between positions at the front and rear of said platform.

11. The structure of claim 1 wherein said frame and means for rotating it relative to said platform include a continuous drive element drivably embracing the periphery of said frame and engaging a stationary power means.

12. A hay stacking machine, comprising:

a platform having a top surface for the building of a hay stack thereon, said platform having a depression forming a trough extending to the periphery of said platform;

support means for supporting said platform above a supply of hay;

transport means associated with said platform for picking said hay up from said supply and moving said hay in said trough longitudinally thereof to said platform surface over said trough;

means associated with said platform for moving said hay from said trough into a layer upon said platform surface and for moving said layer over said trough in said platform surface, whereby said moving layer of hay sweeps up said hay moved to said platform surface and forms a hay stack from the bottom thereof.

13. The structure of claim 12 wherein said transport means includes a means for compressing and flattening said hay prior to being fed into said trough.

14. The structure of claim 13 wherein said transport means further includes auger means for moving said hay in transport laterally inwardly and then through said means for compressing and flattening said hay.

15. The structure of claim 12 wherein said trough is further defined as including a longitudinally extending vertical side wall and a bottom wall extending from the base of the side wall laterally upwardly from said side wall and longitudinally inwardly and upwardly from the periphery of said platform to merge into said platform top surface.

16. The structure of claim 15 wherein said bottom wall is further defined as including first and second portions, said first portion extends longitudinally inwardly from the periphery to merge with said second portion which extends inwardly and upwardly to merge with said platform surface.

17. The structure of claim 16 wherein said platform includes a portion extending substantially over said trough vertical side wall and an adjacent portion of said trough bottom wall.

18. The structure of claim 17 wherein reciprocating feed means are positioned in the bottom wall of said trough below and substantially covered by said platform portion for moving said hay in said trough to said platform surface.

19. The structure of claim 18 wherein said vertical side wall of said trough includes reciprocating feed means substantially covered by said platform portion for moving said hay to said platform surface.

20. The structure of claim 17 wherein said platform portion includes at its longitudinal inner end a laterally extending notch extending to substantially said vertical side wall of said trough.

21. The structure of claim 18 wherein said reciprocating feed means in said trough bottom wall are further defined as being a plurality of longitudinally spaced teeth having longitudinally inwardly facing gripping edges and outwardly facing smooth edges for passing under hay whereby said hay is moved longitudinally inwardly in said trough by said teeth gripping edges when said teeth are moving inwardly and said smooth edges pass under said hay as said teeth move outwardly.

22. The structure of claim 21 wherein said gripping edges are further defined as being substantially perpendicular to the line of travel of said teeth as they are reciprocated and said smooth edges taper from the top thereof longitudinally outwardly and towards the bottom wall of said trough.

23. The structure of claim 18 wherein said reciprocating feed means in said vertical side wall of said trough are further defined as being teeth longitudinally spaced on a frame member connected to a crank which during half of each revolution moves said frame members and thereby moves said teeth longitudinally forwardly and laterally inwardly into said trough while during the other half of each revolution of said crank said frame member and teeth are moved longitudinally outwardly and laterally outwardly of said trough to move hay through said trough towards said platform surface during the first half revolution and move outwardly in spaced relation to said hay during the other half of each revolution of said crank.

24. The structure of claim 23 wherein said reciprocating feed means in said trough bottom wall are further defined as being a plurality of longitudinally spaced teeth having longitudinally inwardly facing gripping edges and outwardly facing smooth edges for passing under hay whereby said hay is moved longitudinally inwardly in said trough by said teeth gripping edges when said teeth are moving inwardly and said smooth edges pass under said hay as said teeth move outwardly.

25. The structure of claim 24 wherein said feed means in said bottom wall of said trough is connected to said crank to be reciprocated in said trough.

26. The structure of claim 25 wherein said crank rotates about an axis at a point intermediate the ends of said crank and said frame member for said feed means in said side wall is connected to one end of said crank and said feed means in said trough bottom wall is connected to the other end whereby each feed means is 180° out of phase with the other feed means.

27. The structure of claim 18 wherein said reciprocating feed means in said vertical side wall of said trough is further defined as being teeth extending into said trough through said side wall and being pivotable forwardly only whereby during forward travel hay will be moved forwardly toward said platform surface and during rearward travel said teeth will pivot forwardly in response to forward pressure from said hay thereby allowing said teeth to pass under said hay.

28. The structure of claim 12 wherein said platform is pivotally mounted on a vehicle frame for pivoting between a horizontal transport position to a tilted position with the rear edge thereof extending downwardly towards the ground for unloading said platform and said trough having an outer end in communication with said transport means when said platform is in said horizontal transport position whereby said hay may be moved up from said supply to said trough to said platform surface.

29. The structure of claim 12 wherein said trough is further defined as being radially positioned on said platform and having an outer end at the periphery of said platform in communication with said transport means for picking up said hay and an inner end at the axial center of said platform.

30. The structure of claim 12 wherein said trough includes a longitudinal axis parallel to the longitudinal axis of said machine and the travel path of said machine.

31. The structure of claim 30 wherein said transport means for picking up said hay is positioned on the front side of said machine and feeds hay rearwardly into the trough at the periphery of said platform.

32. The structure of claim 31 wherein said transport means includes means for laterally compressing said hay into a row of hay prior to being fed into said trough.

33. A hay stacking machine, comprising:

a platform having a top surface for the building of a hay stack thereon, said platform having a depression;

support means for supporting said platform above a supply of hay;

transport means for picking said hay up from said supply and moving said hay to said platform surface over said depression;

a frame positioned around the periphery of said platform, a plurality of radially extending compression arms vertically moveably connected to said frame and adapted to move between a lower position adjacent the platform to an up position, and power means for yieldably maintaining pressure through said arms on hay on said platform and means for rotating said frame with said arms engaging said hay for moving hay into a layer and over said depression in said platform surface whereby said moving layer of hay sweeps up said hay moved to said platform surface and forms a stack from the bottom thereof with said compression arms moving upwardly as the stack increases in height.

34. The structure of claim 12 wherein the longitudinal axis of said trough is substantially perpendicular to an arcuate travel path of said hay on said platform.

35. The structure of claim 12 wherein means is pivoted for maintaining pressure on said hay directly contacting said platform top surface.

36. The structure of claim 35 wherein said means for maintaining said pressure includes a plurality of vertical movable arms adapted to engage hay on said platform surface.

*37. A hay stacking machine comprising:*

*a platform having a top surface for the building of a hay stack thereon, said platform having an enlarged trough extending from the outer periphery toward the center of said platform;*

*first means associated with said platform for receiving hay from a supply of hay and moving the hay in said trough longitudinally thereof toward the center of said platform; and*

*second means associated with said platform for moving hay from said trough to said platform surface and for moving hay around said platform top surface to form a hay stack from the bottom thereof.*

*38. The machine of claim 37 wherein the platform is generally circular and said trough is disposed generally radially and extends from the outer periphery toward the center thereof.*

*39. The machine of claim 37 wherein said platform has a bottom wall inclined upwardly in a circumferential direction forming said trough, said bottom wall merging with the top surface of the platform.*

*40. The machine of claim 39 including an upright side wall extended between the bottom wall and top surface of the platform, said first means having movable feed means associated with said side wall engagable with hay in said trough to move said hay toward the center of the platform.*

*41. The machine of claim 40 wherein said movable feed means include reciprocating finger means located below the top surface of the platform.*

*42. The machine of claim 37 wherein said second means includes a cage surrounding the platform, means movably mounting the cage on the platform, and means for moving the cage relative to the platform.*

*43. The machine of claim 42 wherein said second means further includes arm means movably mounted on the cage and extended over the platform and engages the hay on said platform.*

*44. The machine of claim 43 including means associated with the arm means to bias the arm means toward said platform.*

*45. The machine of claim 43 wherein said arm means comprise a plurality of arms pivotally mounted on the cage, each arm having a first arm pivotally mounted on the cage and a second arm pivotally mounted on the cage and slidably connected to the first arm.*

*46. The machine of claim 37 wherein said second means includes compression means for engaging the hay on said platform and yieldably maintaining pressure on the hay on said platform.*

*47. A hay stacking machine comprising:*

*a platform having a top surface for the building of a hay stack thereon, said platform having an elongated trough extending from the outer periphery to the interior of said platform;*

*first means associated with said platform for feeding hay into said trough generally at the outer periphery of said platform;*

*second means associated with said platform for moving hay in said trough from the outer periphery of said platform toward the interior thereof; and*

*third means associated with said platform for moving hay from said trough to said platform top surface and for moving hay around said platform top surface to form a hay stack from the bottom thereof.*

*48. The machine of claim 47 wherein said platform has a bottom wall inclined upwardly in a circumferential direction forming said elongated trough, saaid bottom wall merging with the top surface of the platform.*

*49. The machine of claim 48 including an upright side wall extended between the bottom wall and top surface of the platform, said second means having movable feed means associated with said side wall engagable with hay in said trough to move said hay toward the center of the platform.*

*50. The machine of claim 49 wherein said movable feed means include reciprocating finger means located below the top surface of the platform.*

*51. The machine of claim 47 wherein said third means includes compression means for engaging the hay on said platform and yieldably maintaining pressure on the hay on said platform.*

*52. The machine of claim 51 wherein said third means further includes arm means movably mounted on the cage and extended over the platform and engages the hay on said platform.*

*53. The machine of claim 52 wherein means associated with the arm means to bias the arm means toward said platform.*

*54. The machine of claim 53 wherein said arm means comprise a plurality of arms pivotally mounted on the cage, each arm having a first arm pivotally mounted on the cage and a second arm pivotally mounted on the cage and slidably connected to the first arm.*

*55. The machine of claim 48 wherein said third means includes compression means for engaging the hay on said platform and yieldably maintaining pressure on the hay on said platform.*

* * * * *

UNITED STATES PATENT AND TRADEMARK OFFICE

CERTIFICATE OF CORRECTION

PATENT NO. : RE 30,200

DATED : February 5, 1980

INVENTOR(S) : Donald L. Henke

It is certified that error appears in the above-identified patent and that said Letters Patent are hereby corrected as shown below:

Column 10, line 5, "lower" should be --lowered--.

Column 10, line 29, "enlarged" should be --elongated--.

Column 11, line 29, "saaid" should be --said--.

Signed and Sealed this

*Sixth* Day of *May 1980*

[SEAL]

*Attest:*

SIDNEY A. DIAMOND

*Attesting Officer*

*Commissioner of Patents and Trademarks*